(12) United States Patent
Tank et al.

(10) Patent No.: US 11,170,065 B2
(45) Date of Patent: Nov. 9, 2021

(54) TECHNOLOGY AGNOSTIC UI MICROSERVICES

(71) Applicant: Citrix Systems, Inc., Fort Lauderdale, FL (US)

(72) Inventors: Nagendra Tank, Bengaluru (IN); Shiv Prasad Khillar, Bengaluru (IN); Saifulla Shaik, Bengaluru (IN); Kapil Jaisinghani, Bengaluru (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 8 days.

(21) Appl. No.: 16/785,096

(22) Filed: Feb. 7, 2020

(65) Prior Publication Data

US 2021/0248205 A1      Aug. 12, 2021

(51) Int. Cl.
G06F 15/16     (2006.01)
G06F 16/957    (2019.01)
G06F 16/958    (2019.01)

(52) U.S. Cl.
CPC ...... *G06F 16/9574* (2019.01); *G06F 16/9577* (2019.01); *G06F 16/972* (2019.01); *G06F 16/986* (2019.01)

(58) Field of Classification Search
CPC ............... G06F 16/9574; G06F 16/986; G06F 16/9577; G06F 16/972

USPC .......................................... 709/203, 218–220
See application file for complete search history.

(56) References Cited

U.S. PATENT DOCUMENTS

| | | |
|---|---|---|
| 2013/0346529 A1* | 12/2013 | Ku ........................ H04L 51/32 709/206 |
| 2019/0087178 A1* | 3/2019 | Buehler ................ H04L 61/308 |
| 2020/0396225 A1* | 12/2020 | Bhatia ..................... G06F 9/451 |

* cited by examiner

*Primary Examiner* — Duyen M Doan
(74) *Attorney, Agent, or Firm* — Foley & Lardner LLP

(57) ABSTRACT

Described embodiments provide systems and methods for providing a web application composed of micro-frontends. The systems and methods can receive a request to access a micro-frontend of a user interface for a web-application from a client application executing on a client device. The systems and methods can retrieve one or more user interface specifications corresponding to a micro-service that provides the micro-frontend. The systems and methods can identify a plurality of resources used by the micro-service corresponding to the user interface specification. The systems and methods can add a plurality of tags to a web page based on the plurality of resources. The systems and methods can load the plurality of resources to establish data objects for the micro-service, in response to adding the plurality of tags to the web page, to construct a document object model for rendering via the client application executing on the client device.

20 Claims, 6 Drawing Sheets

TECHNOLOGY AGNOSTIC UI MICROSERVICES

FIELD OF THE DISCLOSURE

This application generally relates to providing a user interface composed of micro-frontends based on user interface specifications. For example, the present disclosure provides systems and methods to specify, onboard, and deploy micro-frontend user interfaces into web-based applications for client devices.

BACKGROUND

Applications, such as web-based applications, can include a user interface that is presented via a client computing device. As applications become larger and more complex, they can include multiple components that may be developed by different teams. However, it can be challenging to execute the various components to present the user interface for the application, as well as efficiently, reliably, and consistently test, debug, and release such applications that include disparate components developed and provided by various teams.

SUMMARY

This Summary is provided to introduce a selection of concepts in a simplified form that are further described below in the Detailed Description. This Summary is not intended to identify key features or essential features, nor is it intended to limit the scope of the claims included herewith.

This technical solution is generally directed to technology agnostic user interface ("UI") micro-services. For example, systems and methods of this technical solution can provide a web application including multiple micro-services that are loaded into a web page by a layout service.

User interfaces can be composed of many elements and can serve several micro-service frontends. Micro-services can refer to, for example, embedded micro-applications. The micro-services can be rendered in a larger user interface including many micro-service applications. Different micro-services can be developed by different teams, which may operate independently from one another and potentially result in different release schedules, testing schedules, and programming language backends. Using inline-frames to integrate each of these micro-services into a single web-application interface package for execution on a client device, however, can negatively impact the release cycle of the parent container web application. Furthermore, inline-frames may be dependent on a monolithic interface backend, and may not be implemented using different programming languages. Testing inline-frame-based systems can be challenging because the individual components may be tested once the full web application including each micro-service has been assembled into a release candidate.

At least one aspect of the present technical solution is directed to a method of providing a web application composed of micro-frontends. The method can be performed by one or more processors. The method can include a layout service executed by the one or more processors receiving, from a client application executing on a client device, a request to access a micro-frontend of a user interface for a web application. The web application can be composed of multiple micro-frontends provided by a plurality of heterogeneous micro-services. The method can include the layout service retrieving, in response to the request, one or more user interface specifications. The one or more user interface specifications can correspond to a micro-service of the plurality of heterogeneous micro-services that provides the micro-frontend. The method can include the one or more processors identifying a plurality of resources used by the micro-service of the plurality of heterogeneous micro-services. The micro-service can correspond to the one or more user interface specifications. The method can include adding, by the layout service, a plurality of tags to a web page based on the plurality of resources identified by the router for the micro-service of the plurality of heterogeneous micro-services. The method can include loading, by the layout service responsive to the addition of the plurality of tags to the web page, the plurality of resources to establish data objects for the micro-service of the plurality of heterogeneous micro-services. The data objects can be established in a JavaScript used by a framework to construct a document object model for rendering. The document object model can be rendered via the client application executing on the client device. The micro-frontend of the user interface of the web application can be composed of the plurality of micro-frontends established by the plurality of heterogeneous micro-services.

In some implementations, the method can include onboarding, by the layout service using the one or more user interface specifications, the plurality of heterogeneous micro-services in a cache and a content delivery network that is accessible by the layout service during runtime. In some implementations, the method can include storing, in cache accessible by the layout service, the one or more user interface specifications corresponding to the plurality of heterogeneous micro-services. The method can include parsing the one or more user interface specifications to identify the plurality of resources associated with the plurality of heterogeneous micro-services. The method can include downloading, via a public network or using a default authentication policy, the plurality of resources for storage in a content delivery network by the layout service.

In some implementations, the method can include onboarding a first micro-service of the plurality of heterogeneous micro-services during a first release cycle. The method can include onboarding a second micro-service of the plurality of heterogeneous micro-services during a second release cycle different from the first release cycle. The first micro-service and the second micro-service can be used to provide the plurality of micro-frontends that compose the user interface of the web application. In some implementations, the method can include receiving an update to a subset of the plurality of heterogeneous micro-services. The method can include onboarding the subset of the plurality of heterogeneous micro-services to provide the user interface of the web application composed of the plurality of micro-frontends established by the plurality of heterogeneous micro-services comprising the updated subset of the plurality of heterogeneous micro-services. In some implementations, the plurality of heterogeneous micro-services are constructed using a plurality of different frameworks comprising at least two of React, AngularJS, or VueJS.

In some implementations, the method can include loading a plurality of cascade style sheets corresponding to the plurality of micro-frontends established by the plurality of heterogeneous micro-services to compose the user interface of the web application. In some implementations, the method can include resolving conflicts between the plurality of heterogeneous micro-services. The method can include de-duplicating, during loading, the data objects used by the plurality of micro-frontends. In some implementations, the method can include rendering at least two of the plurality of micro-frontends. The method can include communicating information between the rendered at least two of the plurality of micro-frontends using a JavaScript properties variable or a JavaScript context variables. In some implementations, the user interface of the web application composed of the plurality of micro-frontends is rendered without an inline frame.

At least one other aspect of the present technical solution is directed to a system to provide a web application composed of micro-frontends. The system can include a layout service executed by one or more devices including one or more processors. The layout service can receive, from a client application executed on a client device, a request to access a micro-frontend of a user interface for a web application. The web application can be composed of a plurality of micro-frontends provided via a plurality of heterogeneous micro-services. The layout service can retrieve, responsive to the request, one or more user interface specifications corresponding to a micro-service of the plurality of heterogeneous micro-services that provides the micro-frontend. The layout service can identify a plurality of resources used by the micro-service of the plurality of heterogeneous micro-services corresponding to the one or more user interface specifications. The layout service can add a plurality of tags to a web page based on the plurality of resources identified for the micro-service of the plurality of heterogeneous micro-services. The layout service can load, responsive to the addition of the plurality of tags to the web page, the plurality of resources to establish data objects for the micro-service of the plurality of heterogeneous micro-services. The data objects can be established in a JavaScript used by a framework to construct a document object model. The document object model can be rendered, via the client application executing on the client device. The micro-frontend of the user interface of the web application can be composed of the plurality of micro-frontends established by the plurality of heterogeneous micro-services.

In some implementations, the layout service can onboard, using the one or more user interface specifications, the plurality of heterogeneous micro-services in a cache and a content delivery network that is accessible by the layout service during runtime. In some implementations, the layout service can store, in cache accessible by the layout service, the one or more user interface specifications corresponding to the plurality of heterogeneous micro-services. The layout service can parse the one or more user interface specifications to identify the plurality of resources associated with the plurality of heterogeneous micro-services. The layout service can download, via a public network or using a default authentication policy, the plurality of resources for storage in a content delivery network by the layout service.

In some implementations, the layout service can onboard a first micro-service of the plurality of heterogeneous micro-services during a first release cycle. The layout service can onboard a second micro-service of the plurality of heterogeneous micro-services during a second release cycle different from the first release cycle. The first micro-service and the second micro-service are used to provide the plurality of micro-frontends that compose the user interface of the web application. In some implementations, the layout service can receive an update to a subset of the plurality of heterogeneous micro-services. The layout service can onboard the subset of the plurality of heterogeneous micro-services to provide the user interface of the web application composed of the plurality of micro-frontends established by the plurality of heterogeneous micro-services comprising the updated subset of the plurality of heterogeneous micro-services.

In some implementations, the plurality of heterogeneous micro-services are constructed using a plurality of different frameworks comprising at least two of React, AngularJS, or VueJS. In some implementations, the layout service can load a plurality of cascade style sheets corresponding to the plurality of micro-frontends established by the plurality of heterogeneous micro-services to compose the user interface of the web application. In some implementations, the layout service can resolve conflicts between the plurality of heterogeneous micro-services. The layout service can de-duplicate data objects used by the plurality of micro-frontends to load the plurality of resources.

At least one other aspect of the present technical solution is directed to a non-transitory computer readable medium storing program instructions for causing one or more processors to carry out one or more actions described herein. The program instructions can cause the one or more processors to receive, from a client application executed on a client device, a request to access a micro-frontend of a user interface for a web application composed of a plurality of micro-frontends provided via a plurality of heterogeneous micro-services. The program instructions can cause the one or more processors to retrieve, responsive to the request, one or more user interface specifications corresponding to a micro-service of the plurality of heterogeneous micro-services that provides the micro-frontend. The program instructions can cause the one or more processors to identify a plurality of resources used by the micro-service of the plurality of heterogeneous micro-services corresponding to the one or more user interface specifications. The program instructions can cause the one or more processors to add a plurality of tags to a web page based on the plurality of resources identified for the micro-service of the plurality of heterogeneous micro-services. The program instructions can cause the one or more processors to load, responsive to the addition of the plurality of tags to the web page, the plurality of resources to establish data objects for the micro-service of the plurality of heterogeneous micro-services. The data objects can be established in a JavaScript used by a framework to construct a document object model. The document object model can be rendered via the client application executing on the client device. The micro-frontend of the user interface of the web application composed of the plurality of micro-frontends established by the plurality of heterogeneous micro-services. In some implementations, the program instructions can cause the one or more processors to onboard, using the one or more user interface specifications, the plurality of heterogeneous micro-services in a cache and a content delivery network that is accessible by the layout service during runtime.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure.

The drawing figures are not necessarily to scale, emphasis instead being placed upon illustrating embodiments, principles and concepts. The drawings are not intended to limit the scope of the claims included herewith.

DETAILED DESCRIPTION

Figure 1A:
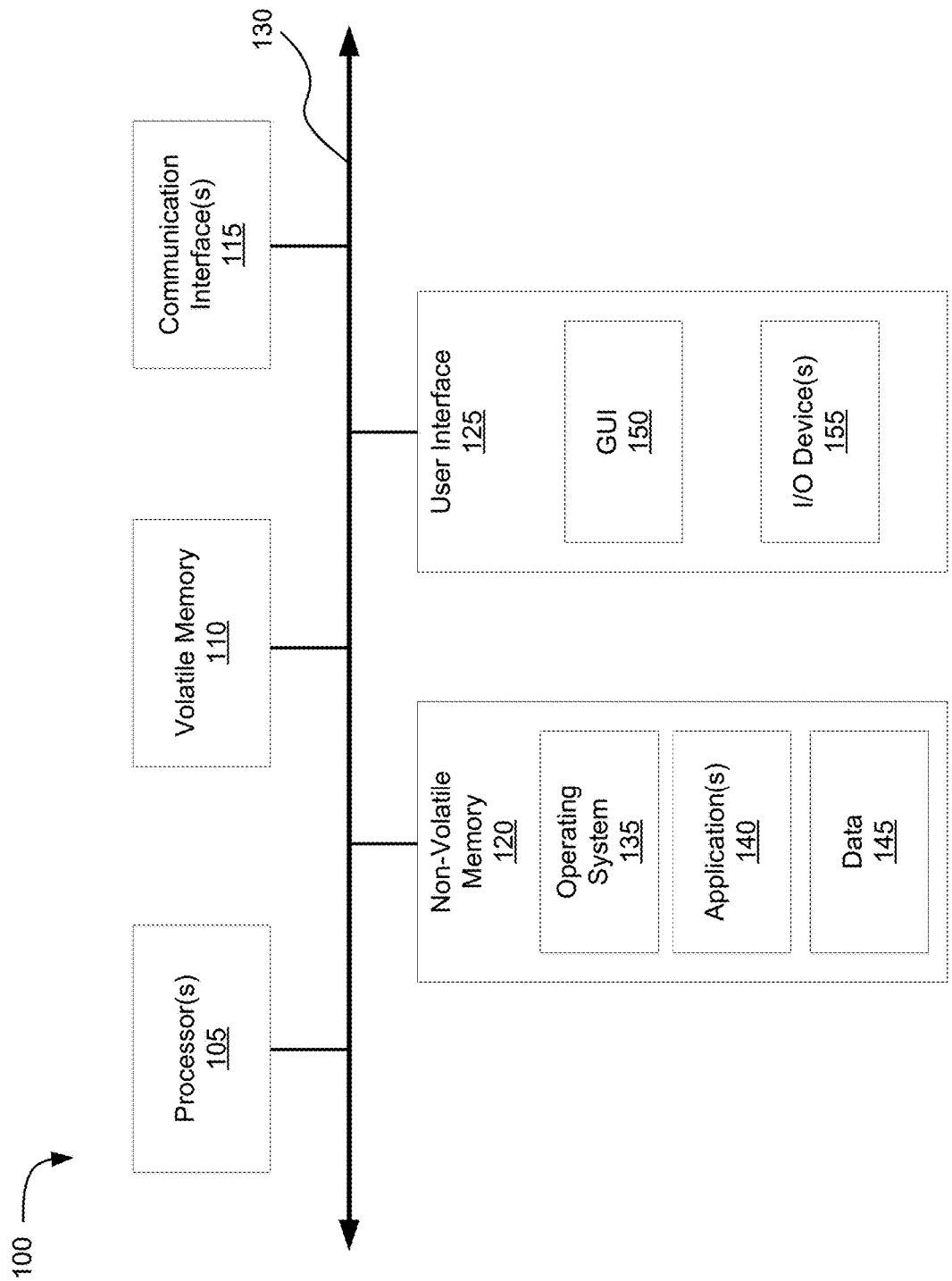
FIG. 1A is a block diagram of embodiments of a computing device.

For purposes of reading the description of the various embodiments below, the following descriptions of the sections of the specification and their respective contents may be helpful:

This technical solution is directed to systems and method for onboarding and providing specifications and resources to establish micro-frontends as a part of a web application. Due to the increasing demand to diversify development of application platforms, and the increased interest in developing solutions to issues that arise out of monolithic release schedules, it can be challenging to onboard, provide, and deliver user interfaces across a number of separate micro-services which are integrated into a single web application. Each micro-service may be developed by an independent team, using its own programming language and interfaces. The separate micro-interfaces are integrated into a single web application by separate teams, which can result in errors, faults or bugs in the execution of the various micro-interfaces or integration, thereby causing an increase in computer resource utilization, network bandwidth usage, computing latency, as well as introduce delays with respect to testing, conflicting release schedules, and user interface consistency.

For example, because each micro-service can be developed independently, the release schedule of each micro-service may be dictated by the release schedule of the monolithic container web application. Integration of many micro-services into a single web application can cause additional bugs to appear in code, for example from unanticipated or unknown conflicts between micro-services, which can increase the overall computational complexity of testing the monolithic web application. Furthermore, integration of micro-services into a monolithic web application can result in duplicate resources that are common to two or more micro-services. This can negatively affect the launch performance of the web application, because the monolithic web application makes additional, unnecessary network requests for resources to access each micro-service, which can reduce the computational performance of the web application and the computer system executing the web application. Monolithic web applications may also unnecessarily utilize additional storage space to store each of the redundant resources.

The systems and methods of this technical solution can establish a plurality of micro-frontends as data objects rendered in a container web application on a client device. Instead of providing a monolithic web application, each of the micro-frontends represent at least one micro-service, and can be developed, updated, and deployed by independent development teams on independent release cycles, thereby providing a technical improvement or improvement to application user interface technology relative to inline-frame approaches. Furthermore, the systems and methods of the present disclosure provide a platform and language agnostic approach to user interface development for each micro-frontend, allowing each development team more flexibility with respect to the development of each micro-service.

The system, executing a layout service, can receive a request for a micro-frontend from a client application executing on a client device. The layout service can retrieve a user interface specification which corresponds to the requested micro-frontend. The layout service can identify one or more resources corresponding to the user interface specification, for example from a content delivery network. The layout service can add a plurality of tags to a web page based on the one or more identified resources. The layout service can load, in response to the addition of the plurality of tags to the web page, the plurality of resources to establish data objects for the micro-service. The data objects can be established in a JavaScript used by a frame work to construct a document object model. The document object model can be rendered in the client application executed by the client device.

Section A describes a computing environment which may be useful for practicing embodiments described herein; and Section B describes systems and methods for providing web applications composed of one or more micro-frontends.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
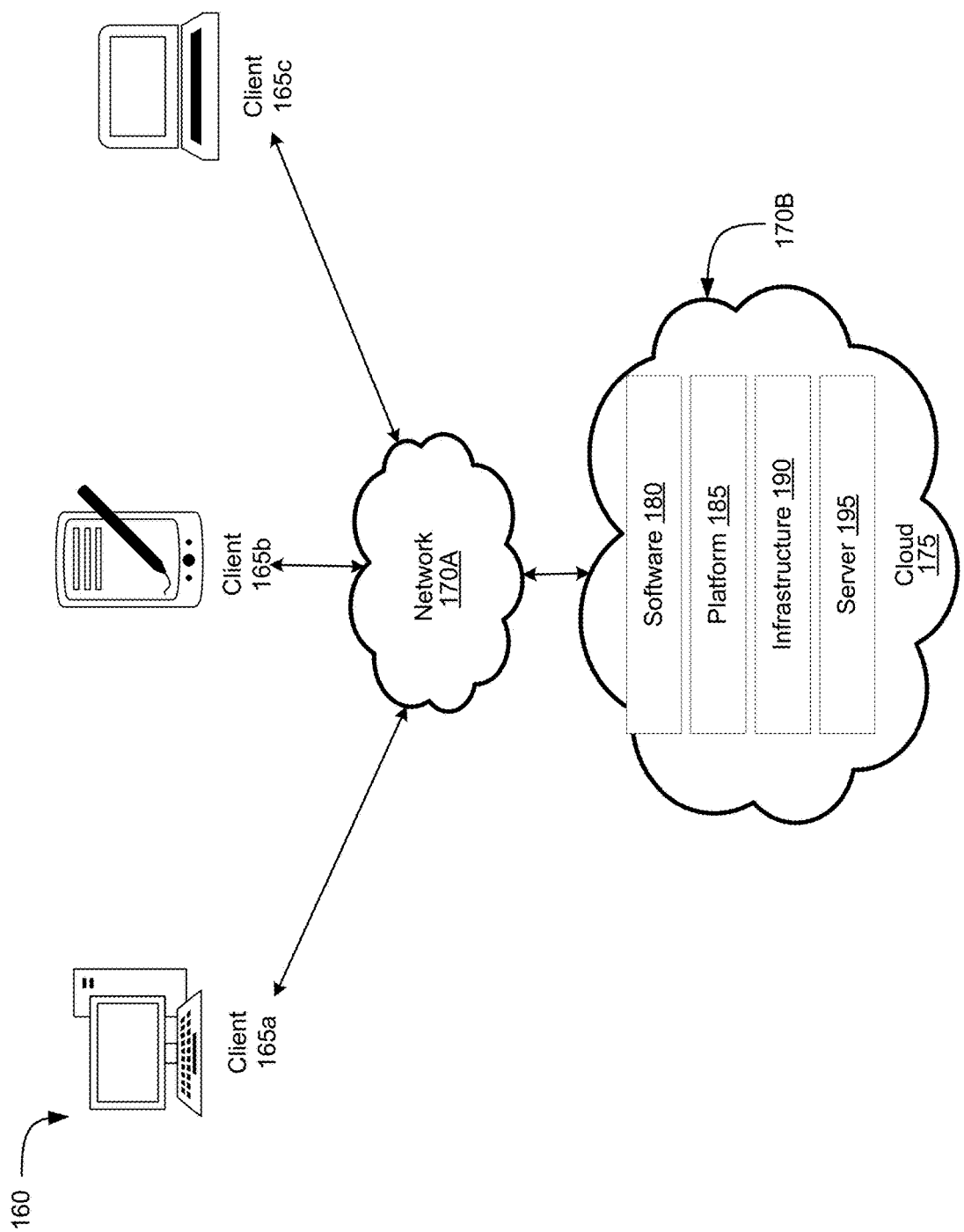
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Providing Web Applications Including Micro-Frontends

This technical solution is directed towards systems and methods for providing a web application composed of micro-frontends using user interface specifications. The user interface specifications can be used to load one or more resources and tags to generate a script to render one or more micro-frontends in a client application executing on a client device.

The system can execute a layout service, which can receive requests for one or more micro-frontends corresponding to a micro-service. The layout service can load one or more user interface specifications from a cache, and one or more resources from a content delivery network to establish a JavaScript to construct a document object model. The one or more resources can include style sheets, script libraries, and HTML code, among others. The layout service can support micro-frontends compatible with one or more scripting frameworks (e.g., AngularJS, ZoneJS, and ReactJS, among others). The layout service can insert one or more tags corresponding to the one or more resources into a web page, which can be rendered by the client application in the client device. In some implementations, the tags can be added to the web page from the one or more resources associated with the requested micro-frontend.

At least one advantage of this technical solution over other implementations is that accessing resources to construct data objects in a document object model can avoid the need to render the micro-frontends in inline frames in the web application. In some cases, each JavaScript bundle may only be loaded when the corresponding micro-service is accessed by the application executing on the client device, which provides a technical improvement by reducing the number of JavaScript bundles that are loaded since the application may access one or a subset of the micro-services of the application. This technique can significantly improve performance over other implementations that load all JavaScript bundles for each micro-service when the web application loads. The present disclosure also allows each micro-service to establish its own style sheet, thereby avoiding conflicts with style sheets of other micro-services. This is a significant improvement over other implementations which use shared style sheets. The present technical solution provides an additional technical improvement by caching each JavaScript bundle in memory of the client device, thereby reducing the number of server requests to access a bundle which may have already been transferred to the client device. The implementations of the present disclosure provide significant improvements over implementations that do not provide caching of JavaScript bundles by reducing the network resource utilization of the system.

Another technical improvement described in the present disclosure is a common dependency engine which can check the scripting packages (e.g., JavaScript packages, etc.) for each micro-service at run-time. The dependency engine can ensure that the client application only loads script packages which are common to more than one micro-service one time, thereby significantly reducing network and computing resource utilization when compared to other implementations. At least one other technical improvement of the systems and methods described herein is a discovery service, which can automatically discover and onboard each micro-service without adding any additional code to the container application (e.g., the web application, etc.). This provides a significant improvement over implementations which require manual addition of code to the container application in order to onboard additional micro-services. Accordingly, the implementations of the present disclosure can decrease development time and decrease the computing resources required to execute and test the additional code in the container application each time a micro-service is onboarded.

At least one other technical improvement described herein is the ability of the systems to provide run-time updated micro-services without the need to restart the container application. This provides a technical improvement over other implementations, because it can reduce the overall network utilization of the container application by only loading the updated micro-services at run-time. This can eliminate the need to restart the container application and reload each of the JavaScript packages associated with each micro-service, as in other implementations. Another technical improvement of the present disclosure is provided by containing information in JavaScript scope variables. Maintaining information in this way allows the systems and methods described herein to provide communication between each micro-service without compromising security, unlike other implementations which is the global scope to share information between micro-services or micro-frontends.

The systems and methods described herein can incorporate micro-frontends developed with a number of different JavaScript back-ends, for example ReactJS, ZoneJS, and VueJS, among others. Furthermore, the systems and methods described herein can provide components using different technology back-ends on a single web application, without requiring additional code or interface specifications. This can provide a significant improvement over other implementations by reducing the computational requirements by reducing the amount of interface code to be executed and tested, and removes the requirement to manually implement an interface for each technology platform. The systems and methods described herein can provide implementations for multi-version deployment of micro-service packages. For example, based on customer traffic or specific customer needs, the systems and methods described herein can provide multiple versions of a micro-service to a client application, a feature not present in other implementations.

Figure 2:
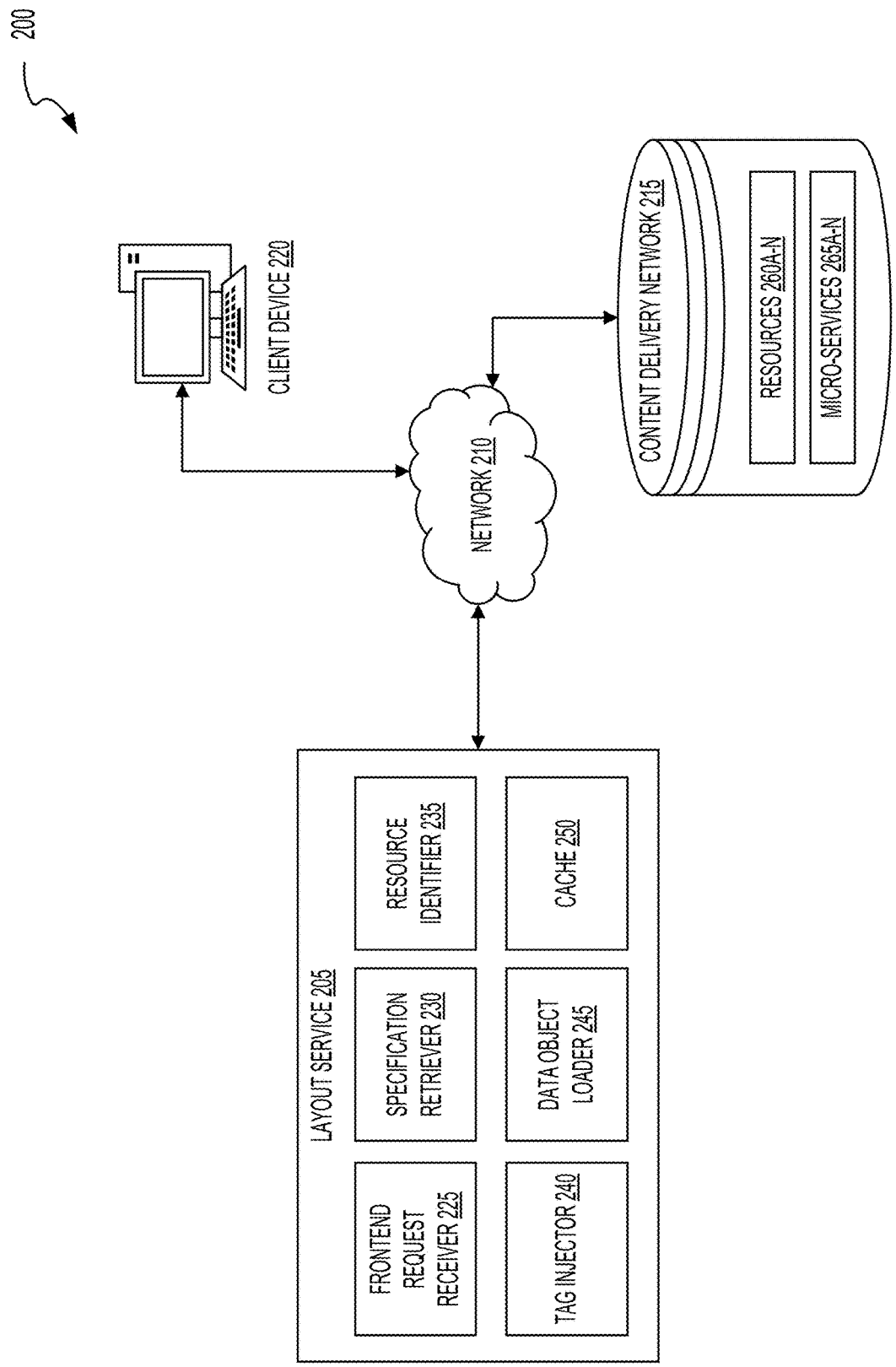
FIG. 2 depicts an example block diagram of a system for providing a web application composed of micro-frontends.

Referring to FIG. 2, depicted is a block diagram of an example system 200 for providing a web application composed of micro-frontends. The system 200 can include at least one layout service 205, at least one network 210, at least one content delivery network 215, and at least one client device 220. The layout service 205 can include at least one frontend request receiver 225. The layout service 205 can include at least one specification retriever 230. The layout service 205 can include at least one resource identifier 235. The layout service 205 can include at least one tag injector 240. The layout service 205 can include at least one data object loader 245. The layout service 205 can include at least one cache 250. The content delivery network 215 can include at least one resources 260A-N (sometimes generally referred to as resources 260). The content delivery network 215 can include at least one micro-services 265A-N (sometimes generally referred to as micro-services 265A-N).

Each of the above-mentioned elements or entities is implemented in hardware, or a combination of hardware and software, in one or more embodiments. Each component of the system 200 may be implemented using hardware or a combination of hardware or software detailed above in connection with FIGS. 1A-1B. For instance, each of these elements or entities can include any application, program, library, script, task, service, process or any type and form of executable instructions executing on hardware of a client device 220, or on a layout service 205. The hardware includes circuitry such as one or more processors in one or more implementations.

The network 210 can include computer networks such as the Internet, local, wide, metro or other area networks, intranets, satellite networks, other computer networks such as voice or data mobile phone communication networks, and combinations thereof. The network 210 can include one or more component or functionality of network 170A depicted in FIG. 1B. The layout service 205 of the system 200 can communicate via the network 210, for instance with at least one client device 220 and at least one content delivery network 215. The network 210 may be any form of computer network that relays information between the client device 220, layout service 205, and one or more content sources, such as the content delivery network 215, web servers, amongst others. In some implementations, the network 210 may include the Internet or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive or transmit data within the network 210. The network 210 may further include any number of hardwired or wireless connections. The client device 220 may communicate wirelessly (e.g., via WiFi, cellular, radio, etc.) with a transceiver that is hardwired (e.g., via a fiber optic cable, a CAT5 cable, etc.) to other computing devices in the network 210. The client device 220 may also communicate wirelessly with the computing devices of the network 210 via a proxy device (e.g., a router, network switch, or gateway).

The layout service 205 can include at least one processor and a memory, e.g., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The layout service 205 can include one or more computing devices or servers that can perform various functions.

The client device 220 can include servers or other computing devices capable of executing one or more applications. The client device 220 may execute one or more applications, for example a web browser, to render and display a web based interface, for example a web-page. The client device 220 can execute different scripting languages embedded in web documents, for example JavaScript, HTML, cascading style sheets (CSS), among others. The client device 220 can execute an application which can request one or more micro-frontends of a user interface to display in the application. For example, the application can be a web application composed of many micro-frontends (e.g., panels, frames, etc.). Each micro-frontend can be an individual user interface for a corresponding micro-service 265. The micro-frontends can each be displayed in the interface of the web application in a location designated by one or more objects or scripts received from the layout service 205. The applicant of the client device 220 can make a request to the layout service 205 for each micro-frontend individually. In some implementations, the client device 220 can request groups of micro-frontends from the layout service 205 in a batch process, thereby reducing the network utilization of multiple requests, which is an improvement over other implementations.

The content delivery network 215 can include one or more servers or databases, each including at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The content delivery service 215 can include one or more computing devices or servers that can perform various functions as described herein.

The content delivery service 215 can include one or more databases or storage mediums configured to store or maintain any of the information described herein, such as one or more resources 260A-N corresponding to one or more micro-services 265A-N. In some implementations, the content delivery network 215 can be prepopulated with any predetermined thresholds or other values used performed in conjunction with the operations related to the layout service 205 or the client device 220. The layout service 205 may store the results of any or all computations, determinations, selections, identifications, or calculations in one or more data structures in the content delivery network 215. The content delivery network 215 can be accessed by any or all of the modules/components of the layout service 205, the client device 220, or any other external computing devices via the network 210. The content delivery service 215 can receive requests for one or more resources 260A-N, one or more micro-services 265A-N, or other content via the network 210 from one or more computing devices, for example the layout service 205 or the client device 220. In some implementations, the content delivery network 215 can be a part of a cloud computing service, for example the cloud 175 depicted in FIG. 1B.

The content delivery service 215 can include one or more micro-services 265, which can provide a corresponding micro-frontend. The micro-frontends of the micro-services 265 can compose, for example, a user interface of a web application which can execute on one or more client devices 220. The micro-services 215 can include one or more frameworks, for example scripting languages or other programming frameworks, such as React (or ReactJS), AngularJS, or VueJS. Each micro-service 265 of the micro-services 265 can include or consist of code or scripts depending on two or more frameworks or programming interfaces. In some implementations, each micro-service 265 is constructed of only one framework or programming back-end. The micro-services 265 can also include formatting data for their corresponding micro-frontends, including cascading style sheets, formatting mark-up documents, among other formatting information. The micro-services 265 can include one or more cascade style sheets for each micro-frontend established by the micro-services 265. The micro-frontends can be user interfaces or contain user interface elements, which can be rendered on at least client device 220, and provide access the functionality of the one or more micro-services 265.

The frontend request receiver 225 can receive a request from a client application executing on the client device 220. The request can include a request to access a micro-frontend of a user interface for a web application composed of a plurality of micro-frontends, provided by a plurality of heterogeneous micro-services 265A-N. The request can include a request for a user interface specification associated with the micro-frontend. For example, the application executed by the client device 220 can include a pointer to a specification defining the layout and script properties of the requested micro-frontend. The frontend request receiver 225 can parse the request form the client device 220, and generate a corresponding link or pointer to the respective specification for retrieval by the specification retriever 230. In some implementations, the frontend request receiver 225 can receive a request to update a micro-frontend provided to the client device 220, thereby allowing the client device 220 to update the micro-services provided by the web application without restarting or refreshing the web application (e.g., the application requesting the micro-frontend). In some implementations, the frontend request receiver 225 can receive a request for a web interface composed of many micro-frontends from the application executing on the client device 220. In such implementations, the frontend request receiver 225 can process a request for each micro-frontend of the requested web interface iteratively (e.g., one at a time, in a predetermined or random order), or in parallel (e.g., one or more requests for a micro-frontend processed simultaneously by one or more processors, etc.).

The frontend request receiver 225 can receive a request to update one or more micro-services 265 from a client application executing on the client device 220, or from another external computing device via the network 210. The request to update a micro-service 265 received from the client device 220 or one or more external computing devices can include update information about the micro-service 265. In some implementations, the update information can include one or more user interface specifications, resources 260, or other information related to the one or more micro-frontends associated with the one or more micro-services 265. The frontend request receiver 225 or any other components of layout service 205 can perform any of the actions or operations described herein to update the micro-service 265, including updating the user interface specification by storing the user interface specification in the cache 250 or the content delivery network 215, updating the resources 260 in the content delivery network 215, identifying additional resources 260 based on the updated user interface specification, among others. The frontend request receiver 225 can coordinate each of the update activities based on the content of the update request received from the client device 220 or an external computing device 220. In some implementations, the request to update one or more micro-services 265 can be received from the content delivery network 215. In some implementations, the update request can include a request to update a subset of all the micro-services 265. The request to update a subset can include one or more user interface specifications corresponding to the micro-services, one or more scripts or APIs corresponding to the subset of the micro-services 265, and one or more resources 260 corresponding to the subset of micro-services 265. In some implementations, updating the one or more micro-services 265 can occur in real-time (e.g., while the micro-frontends provided to the client devices 220 are being used) without interrupting the operations of the one or more micro-services accessed via the client device 220, which is a significant improvement over other implementations.

The layout service 205 (e.g., via specification retriever 230) can retrieve one or more user interface specifications corresponding to a micro-frontend request received by the frontend request receiver 225. The specification retriever 230 can include one or more routers to determine a location of the user interface specification. Each micro-frontend request can include information (e.g., identifiers, pointers, indicators, etc.) of a particular user interface specification associated with the micro-frontend. Each user interface specification can include pointers, links, and or identifiers to resources 260 in the content delivery network 215 that correspond to the requested micro-frontend. The specification retriever 230 can access the cache 250, which can contain one or more user specifications for onboarded micro-frontends. The specification retriever 230 can access one or more data structures in the cache 250 to retrieve the corresponding one or more user interface specifications. In some implementations, each of the user interface specifications are indexed by an index value (e.g., index 0, index 1, index 2, etc.) in the data structure in the cache 250. The micro-frontend request received by the frontend request receiver 225 can include an index value of a corresponding one or more user interface specifications. The specification retriever can access the one or more data structures in the cache 250 to retrieve the user interface specifications which include index values that are indicated in the request received by the frontend request receiver. In some implementations, the request received by the frontend request receiver 225 does not indicate any index values, and instead includes a memory location, link, or other point to direct the specification retriever to a position in one or more data structures in the cache 250 to retrieve one or more user interface specifications. The specification retriever 230 can retrieve the user interface specifications to store in a region of memory in the layout service 205, for example a working memory region.

To onboard a micro-service 265, the specification retriever 230 can receive one or more user interface specifications corresponding to the micro-service 265 from the client device 220. The one or more user specifications received by the specification retriever 230 can include a request to onboard a micro-service 265. Onboarding a micro-service 265 can include transferring data associated with the particular micro-service 265 (e.g., scripts, tags, application programming interfaces (APIs), web-pages, user interface specifications, any other data associated with the micro-service, etc.) to the cache 250 or the content delivery network 215. The layout service 205 or specification receiver 230 can act as a router, and can determine a proper location to route any of the information disclosed herein received from the client device 220, or the content delivery network 215. In some cases, the system 200 can include a separate router device or component that is configured to interface or communicate with layout service 205. For example, the specification retriever 230 can determine a location in the cache 250 or the content delivery network 215 to store one or more user interface specifications in response to an onboard request received from a client device 220. The specification retriever 230 can determine one or more locations in the content delivery network 215 to store one or more resources 260 in response to an onboarding request received from the client device 220. The specification retriever 230 can receive one or more resources 260 associated with the micro-service 265 to be onboarded. The specification retriever 230 can determine a location to store the one or more resources 260 associated with the micro-service 265 in the content delivery network 215. In some implementations, the specification retriever 230 can determine a location in the cache 250 to store the one or more resources 260 in one or more data structures.

The specification retriever 230 can store the one or more user interface specifications in the cache 250. The user interface specifications can be associated with at least one micro-service 265, and can be received from the client device 220, the content delivery network 215, or other external computing devices via the network 210. To store the user interface specifications, the specification retriever 230 can determine a location in at least one of the cache 250 or the content delivery network 215 to store each of the user interface specifications. In some implementations, the specification retriever 230 can allocate a region of memory in at least one of the cache 250 or the content delivery network 215 to store the user interface specifications in one or more data structures.

The resource identifier 235 can parse the one or more user interface specifications retrieved by the specification retriever 230 to identify a plurality of resources 260. The resources 260 identified by the resource identifier 235 can correspond to the user interface specification retrieved by the specification retriever 230. For example, the user interface specification retrieved by the specification retriever 230 can include one or more links, pointers, or associations with a plurality of resources 260. In some implementations, the resource identifier 235 can parse the user interface specification to create a list of resources for the corresponding micro-frontend. In some implementations, the resources 260 can include scripts, images, tags, style sheets, and other information related to a micro-frontend. The resource identifier 235 can identify location in the content delivery network 215 for each of the identified resources 260. For example, after parsing the user interface specification retrieved by the specification retriever 230 to create the list of resources 260, the resource identifier 235 can access other information in the user interface specification to determine a location in the content delivery network 215 where each resource 260 is stored. The resource identifier 235 can store the list of resources, and the locations of each resource, in one or more data structures in the memory of the layout service 205. In some implementations, the resource identifier 235 can store the list of resources 260 and their corresponding locations of each resource 260 in one or more data structures in the cache 250. In some implementations, the resource identifier 235 can store each of the list of resources 260 and the corresponding locations of each resource 260 in one or more data structures including the user interface specification corresponding to the list of resources 260.

To onboard a micro-service 265, the resource identifier 235 can parse the user interface specifications received from the client device 220 by the specification retriever 230 to identify the plurality of resources associated with the plurality of micro-services 265 to be onboarded. Parsing the user interface specifications can include scanning the user specifications using one or more indications of a resource 260 associated with the one or more micro-services 265. Parsing or scanning the user interface specifications can include identifying a list of resources 260 or a list of indications of the resources 260 in the one or more user interface specifications. The resource identifier 235 can download each of the identified resources 260 which identified from the user interface specification into a location in the content delivery network 215 via the network 210. In some implementations, the resource identifier 235 can access the content delivery network 215 using one or more default authentication policies. For example, the resource identifier may contact a trusted computing device or service to receive one or more authentication certificates. These authentication certificates may be signed to ensure the authenticity of the resource identifier 235 or the layout service 205. The authentication certificates may be signed, for example, by one or more certificate authorities (CA), which can include one or more entities or computing services to authenticate users for access to the content delivery network 215. The resource identifier 235 can access the content delivery network 215 by providing the one or more signed authentication certificates. In response to receiving the one or more authentication certificates, the content delivery network 215 can grant access to the resource identifier 235 or the layout service 205, and allow the resource identifier 235 to download the identified resources 260 corresponding to the micro-service 265 in a location in the content delivery network 215. The resource identifier 235 can determine a location in the content delivery network 215 to download the identified resources 260. In some implementations, the content delivery network 215 may provide the location in response to a request to download the resources 260 from resource identifier 235.

The resource identifier 235 or any of the components of the layout service 205 can onboard one or more of the micro-services 265 during one or more release cycles. For example, the resource identifier 235, or any of the other components of the layout service 205, can onboard a first micro-service 265 during a first release cycle. A first release cycle can be during a first time period. The micro-service 265 associated with the first release cycle can include one or more indicators (e.g. version information, etc.) including information about the first release cycle. In some implementations, the micro-service 265 onboarded during the first release cycle can include a user specification which includes information about the first release cycle (e.g., release date, version information, release identifiers, etc.). The release identifier 235 or any of the components of the layout service 205 can onboard a second micro-service 265 of the one or more micro-services 265 during a second release cycle. The second release cycle can be different from the first release cycle (e.g., a different time period, a different micro-service 265 version, different release cycle identifiers, etc.). In some implementations, the resource identifier 235 or any of the components of the layout service 205 can provide one or more micro-frontends to at least one client device 220 corresponding to the micro-service 265 onboarded during the first release cycle, and corresponding to the micro-service 265 onboarded during the second release cycle. The micro-frontends provided to the one or more client device 220 can compose a user interface of a web application on the one or more client devices 220.

The layout service 205 (e.g., via tag injector 240) can add one or more tags corresponding to the list of resources 260 to at least one web page. The web page can be resident in the memory of the layout service 205, or included in the request received by the frontend request receiver 225. The one or more tags can include mark-up language tags, scripts, style sheets, or identifiers, among others. The tag injector 240 can retrieve each tag corresponding the one or more identified resources from the content delivery network 215. In some implementations, the one or more tags are retrieved from a data structure in the memory of the layout service 205. In some implementations, tag injector 240 can generate each of the one or more tags based on the one or more user interface specifications or the one or more resources. In some implementations, the request received by the frontend request receiver 225 can include a web-page, or an indication of a webpage. If the request included an indication of a webpage, the tag injector 240 can access the content delivery network 215 to retrieve the webpage. The tag injector 240 can generate the web-page based on the tags, user interfaces specifications, or the one or more identified resources. In some implementations, a template, or prototype web-page is included in the user interface specification.

The tag injector 240 can add the one or more tags to the web-page. The tag injector 240 can parse the web page to identify document locations to insert each tag. The tag injector 240 can then inject, insert, or otherwise add each tag to the webpage document at each of the document locations. The tags added by the tag injector 240 can include one or more resource identifiers. Each of the resource identifiers can be associated with a respective one of the resources 260 in the list of resources 260 identified by the resource identifier 235. The tag injector 240 can add tags to the web page which define the layout of the webpage, based on the user interface specifications, the list of resources, or the request receive by the application executed by the client device 220. The tag injector 240 can add tags to the web-page by parsing a template of the web-page, which includes one or more indicators or placeholders for tags to be inserted by the tag injector 240. The tag injector 240 can parse the template of the web-page, and replace each of the place holder indicators with one or more tags, which can correspond to the list of resources 260. In some implementations, the web-page does not include placeholder indicators, and the tag injector 240 can add tags based on information in the list of resources 260 identified by the resource identifier 235, and the user interface specification retrieved by the specification retriever 230.

The data object loader 245 can load each of the resources identified by the resource identifier 235, for example from the content delivery network 215. The data object loader 245 can load each of the resources to establish a plurality of data objects, for example in a data structure in JavaScript, or another scripting language or storage medium. The data object loader 245 can access the content delivery network 215 to retrieve the one or more resources identified by the resource identifier 235. The data object loader 245 can establish the data objects in response to the tag injector 240 adding the one or more tags to the webpage. In some implementations, the data object loader 245 can establish the data objects before, or after the tag injector 240 add the one or more tags to the web page. Each data object established by the data object loader 245 by loading the one or more resources can be at least one data structure including one or more values. The one or more data structures can include a corresponding one or more of the resources identified by the resource identifier 235. In some implementations, the data object loader can establish data objects in one or more data structures in the memory of the layout service 205. The one or more resources loaded from the content delivery network 215 can include metadata associated with the one or more resources. The data object loader 245 can include the metadata associated with the one or more resources in one or more of the data objects established using the one or more loaded resources.

The data object loader 245 can load each of the resources 260 corresponding to more than one micro-service 265. Each micro-service may have one or more resources in common, or may have conflicting resources that may be loaded simultaneously. The data object loader 245 can load and resolve all conflicts between the micro-services 265 or the resources 260 while establishing the data objects for each micro-service 265. In some implementations, resolving conflicts can include conflict detection logic, which is capable of detecting, by comparing metadata about each micro-service 265 or resource 260, any and all conflicts as the resources are loaded for each of the micro-services 265. For example, two micro-services 265 may have dependencies that conflict, such as two JavaScript packages or libraries that are not compatible with each other. The two JavaScript packages may be incompatible with each other, for example, if the two packages include identical object or method names. The data object loader 265 can determine, for example, compatible JavaScript packages that do not conflict but provide the same functionality to the micro-services 265, thereby resolving the conflict between the two micro-services 265. The data object loader 265 may also change or alter the method, object, or other scripting names or tokens to remove conflicts between two or more JavaScript packages. The data object loader 245 can determine any data objects which the micro-services 265 corresponding to the user interface specifications may have in common, for example any resources or script libraries that are shared between any two micro-services 265. Instead of requesting redundant data from the content delivery network 215, the data object loader can determine when a data object has been used or already downloaded for a different micro-service 265, and de-duplicate the data objects used by the one or more micro-services 265. This has the effect of improving (e.g., reducing) network utilization and increasing performance by eliminating the need to request and load data which has already been downloaded from the content delivery network 215.

In some implementations, the data object loader 245 can render at least two of the micro-frontends provided by the micro-services 265 after loading the resources 260 and establishing the one or more data objects. Rendering the at least two micro-services can include accessing the resources 260, scripts, style sheets, and any other information associated with the one or more micro-services 265. After accessing the resources, the data object loader 245 can prepare each of the resources 260 for display by using the scripts, style sheets, and other information to render the at least two micro-frontends. Rendering the at least two frontends can include preparing each of the frontends can include preparing a region of memory for graphical display, for example a graphics buffer. The data object loader 245 can render the user interface and graphics data into the graphics buffer based on the style sheets, the resources 260, user interface specifications, and other information associated with the information resources. The data object loader 245 can render two or more micro-frontends corresponding to two or more micro-services 265 in a single region, for example a single web page or application window. In some implementations, the data object loader 245 can display the contents of the graphics buffer on a display of the layout service 205. In some implementations, the data object loader 245 can transmit the contents of the graphics buffer to one or more computing devices for display, for example the client device 220. The data object loader 245 can render a user interface including one or more micro-frontends corresponding to one or more of the micro-services 265, for example a user interface of a web application. In some implementations, the data object loader 245 can render the micro-frontends within the user interface without using an inline frame. In some implementations, the data object loader 245 can render the micro-frontends within the user interface using at least one inline frame.

While rendering the two or more micro-frontends corresponding to the micro-services 265, the data object loader 245 can facilitate communication between the two or more micro-frontends or the two or more micro-services. The data object loader 245 can communicate information between at least two of the rendered micro-frontends one or more scripting variables, for example a JavaScript properties variable or a JavaScript context variable. In some implementations, data object loader 245 can communicate information between the two or more micro-services using a plurality of scripting variables, for example a plurality of JavaScript properties variables or a plurality of JavaScript context variables. In some implementations, the data object loader 245 can communicate information between the two or more rendered micro-frontends using another type of scripting variable, for example another type of JavaScript scope variable. Accordingly the data object loader 245 can communicate information between two or more micro-frontends (e.g., two or more micro-services), without using global scope variables. Avoiding the use of global scope variables can improve security by reducing or minimizing the access to data or variables by other components. Accordingly, the communication functionality of the layout service 205 provides an improvement to system security over other implementations that use global scope variables.

The cache 250 can store any or all of the information described herein with respect to the layout service 205, including any data received by, transmitted by, provided to, calculated, determined, or otherwise generated by the layout service 205 or any of the components of the layout service 205. The cache 250 can store user specifications onboarded by the specification retriever 230. The cache 250 can be a memory structure, for example a hard drive, solid-state drive, or other non-volatile memory. In some implementations, the cache 250 can be a volatile memory, for example a random access memory (RAM) of the layout service 205. The cache 250 can be a working memory of the layout service 205, which may be a memory used to perform calculations by the layout service 205. In some implementations, the cache 250 can store one or more resources associated with a micro-service 265. The cache 250 can store one or more web-pages associated with each micro-service 265, and may store one or more tags which can be inserted or added to the web pages by the tag injector 240. The cache 250 can store one or more data structures described herein, including the list of resources identified by the resource identifier 235, or any other data structures described herein. The cache 250 may store one or more requests from one or more client devices 220. In some implementations, the cache 250 can store one or more of the micro-services 265. The cache 250 can store the one or more resources 260 associated with the one or more micro-services 265. The cache may be accessed, for example, by any or all of the components of the layout service 205, the layout service 205, the client device 220 via the network 210, and the content delivery network 215 via the network 210, among others.

Figure 3:
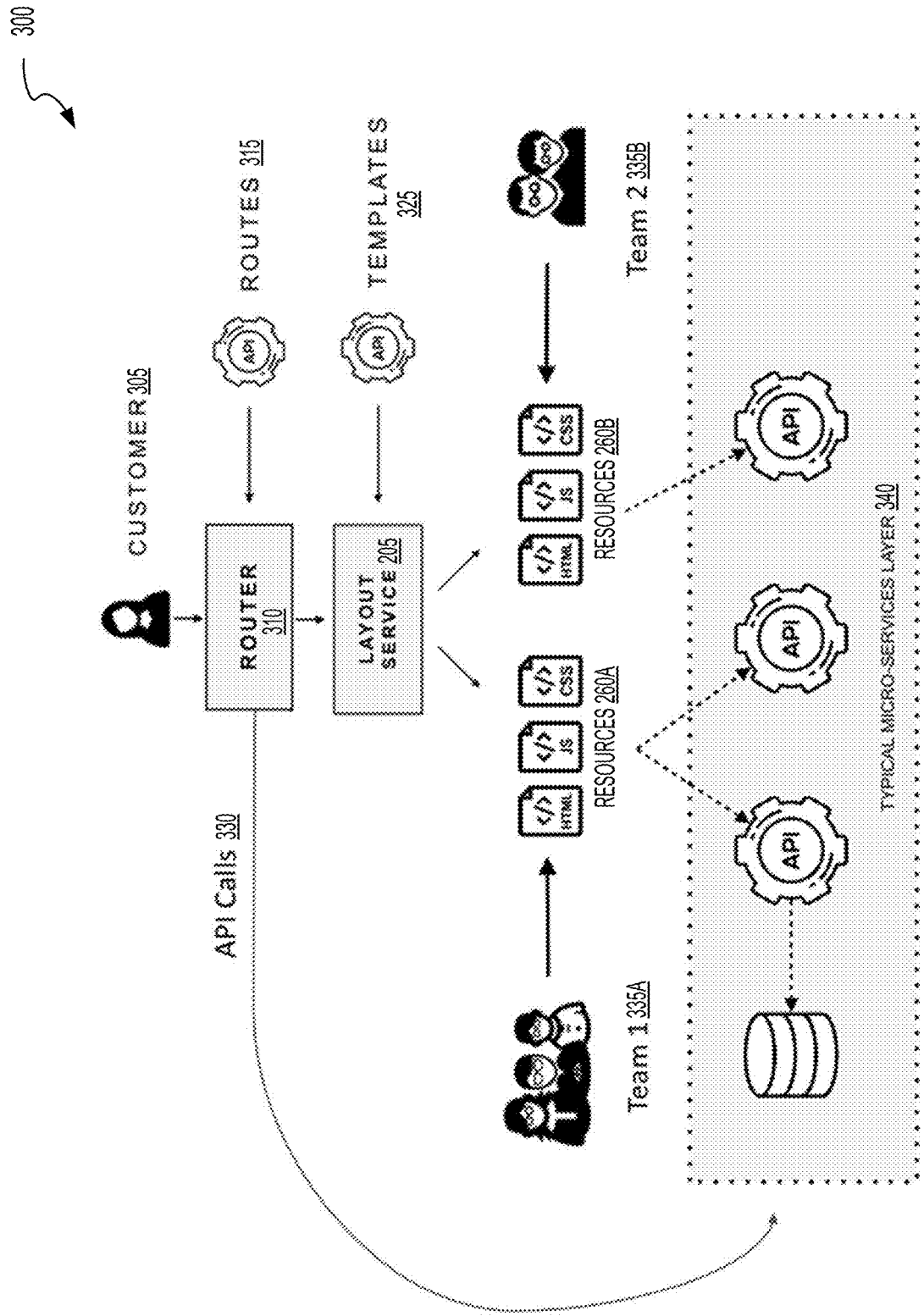
FIG. 3 depicts a block diagram of an example flow for deploying micro-frontends for a plurality of micro-services.

Referring now to FIG. 3, a block diagram of an example flow for deploying micro-frontends for a plurality of micro-services is provided. The flow diagram 300 depicts an example process, flow or operation for providing one or more micro-services (e.g., the micro-services 265) to a customer based on the layout service 205 described herein above with respect to FIG. 2. The system flow diagram 300 can include at least one customer 305, at least one router 310, at least one layout service 205, and at least one micro-services layer 340. The system flow diagram 300 can include at least one routes application programming interface (API) 315, at least one templates API 325, and at least one team 335A-B (sometimes referred to as team 335). The system flow diagram 300 can include at least one API calls 330 to the micro-services layer 340, and at least one resources 260A-B (sometimes referred to as resources 260). The resources 260A-B are described herein above in conjunction with FIG. 2. The system flow diagram 300 can include or be performed by one or more components or functionality depicted in FIG. 1A, 1B, 2, or 4.

The customer 305 can be a computing device (e.g., the client computing device 220) that requests access to one or more micro-services (e.g., the micro-services 265) of the micro-services layer 340. The system flow diagram 300 shows the process of accessing the one or more micro-services. For example, the customer 305 can request access to the functionality of a micro-service in the micro-services layer 340, or may request a micro-frontend for display in web application on a device associated with the customer 305. In some implementations, the customer 305 is a device which has an appropriate display and capabilities to execute a web application (e.g. the client device 220). The customer 305 can display one or more micro-services using a web application composed of one or more micro-frontends. Each of the micro-frontends can be a portion, region, or functional area of a user interface provided by the one or more micro-services. Each micro-service of the micro-services layer 340 can provide one or more micro-frontends for display by the customer 305. Interactions by the customer 305 with the one or more micro-frontends can cause one or more API calls 340 to the micro-services layer 340 to access the features or functionalities of the micro-services provided by the micro-services layer 340.

The customer can execute one or more scripts, programs, or other applications provided by the micro-services layer 340, the router 310, or the layout service 205. For example, the customer 305 can execute one or more scripts including the routes API 315. The routes API 315 can provide functional access to the router 310, by providing access to one or more functions or features of the router 310 through a scripting interface or another type of programming interface. For example, the routes API 315 can include one or more functions or script libraries, header files, metadata, or any other data required to communicate with and access the functionality of the router 310. The customer 305 can access the router 310 by providing the router 310 with one or more requests for micro-frontends associated with the micro-services of the micro-services layer 340. In some implementations, the customer 305 can also provide the router 340 with one or more requests to onboard a micro-service to the micro-service layer 340. Accordingly, the customer 305 can provide the router 310 with one or more user interface specifications which correspond to the one or more micro-services to be onboarded. The customer 305 can provide the router 310 with one or more resources (e.g., the resources 260 depicted in FIG. 2) associated with the one or more micro-services to be onboarded. The customer 305 can receive one or more requests for data from the router 310, the layout service 205, or any other computing devices of the system flow diagram 300. For example, upon providing the router 310 with a user interface specification, the customer 305 can receive a request for one or more resources 260 from the router 310 that are associated with the micro-service to be onboarded. In response to the request, the customer 305 can provide the router 310 with the one or more resources 260.

The customer 305 can access one or more features (e.g., functionalities, scripts, etc.) of the one or more micro-services of the micro-services layer 340 using one or more API calls 330. The micro-frontend of the one or more micro-services of the micro-services layer 340 may contain one or actionable objects, for example buttons, links, clickable items, or any other items which may provide additional functionality in response to some sort of interaction received by the customer 305 including, but not limited to, clicks, swipes, taps, drag-and-drop actions, observation for a predetermined period of time, or any other type of possible interaction with the one or more actionable items on the micro-frontend provided to the customer 305. In some implementations, certain aspects of the micro-fronted may be updated on a periodic basis (e.g., in real-time, every 0.1 second, every second, every 10 seconds, every minute, every 5 minutes, etc.). The micro-frontend provided to the customer by the layout service 205 or the router 310 can include one or more scripts which can provide one or more API calls 330 to the micro-services layer 340. The API calls 330 can include functions, header files, libraries, script files, or any other type of programming interface file or functionality. The customer 305 can user the API calls 330 to interact directly with the micro-services layer 340. For example, an API call 330 can access the micro-services layer 340 in response to a user interaction, such as the actuation of an actionable item, or any of the other types of interactions described herein. The customer 305 may also execute one or more scripts which use one or more API calls 330 to periodically update information in the micro-frontend corresponding to at least one micro-service of the micro-services layer 340. For example, the customer may execute a script which uses an API call 330 to get updated information from the micro-services layer 340 on a periodic basis.

The router 310 can direct, request, or otherwise manage interactions between one or more customers 305 and at least one layout service 205. For example, the router 310 may receive one or more requests from the customer 305 to access at least one micro-fronted provided by a micro-service. Based on the request, the router 310 can determine which of the micro-services provided by the micro-services layer 340 to load and provide to the customer 305. In some implementations, the router 310 can use one or more template APIs 325 to perform any of the actions described herein with respect to the router 310 or the layout service 205. For example, the router 310 can access the one or more templates API 325 to determine which micro-service to access in the micro-service layer 340. In some implementations, the router 310 can use the templates API 325 to onboard a micro-service provided by the customer 305. For example, the router 310 can receive one or more user interface specifications from the customer 305, and apply one or more of the templates API 325 to the one or more user interface specifications. In some implementations, the router 310 can apply the one or more templates API 325 to the user interface specifications to determine a location in the micro-services layer 340 to store the one or more user interface specifications. The router 310 can receive one or more resources 260 from the customer 305 as a part of onboarding a micro-service to the micro-services layer 340. The router can provide the one or more resources or the one or more user interface specifications to the layout service 205 to onboard the micro-service. In some implementations, the one or more resources 260 can be provided by one or more teams 335A-B, for example the first team 335A or the second team 335B. In some implementations, the system flow diagram 300 does not include a router 310, and the customer 305 can interact directly with the layout service 205.

The layout service 205 can provide one or more micro-frontends to the customer 305, either directly or via the router 310. The layout service 205 can perform any and all operations described herein above in conjunction with FIG. 2. The layout service 205 can receive one or more requests for a micro-frontend corresponding to one or more micro-services of the micro-services layer 340 from the router 310 or the customer 305. The request can include an indication of a micro-service (e.g., an index, name, memory address, IP address of a server containing the micro-service, any other kind of identifier or locator, etc.). The layout service can process the request, and provide one or more micro-frontends to the customer 305 either directly, or via the router 310. In some implementations, the layout service 205 can access one or more resources 260 provided by one or more teams 335 to provide the micro-frontend. The micro-frontend provided by the layout service can include one or more API calls 330 to provide the customer 305 with direct access to the functionality of the micro-services layer 340. Accordingly, by interacting directly with the micro-services layer without accessing one or more intermediary devices or routers, the system can provide a significant improvement to network utilization when compared to other implementations which do not provide direct API calls 330 to the micro-services layer 340. The layout service 205 can onboard one or more micro-services provided by either the customer 305 or the teams 335. For example, the teams 335 can provide one or more resources 260 and one or more user interface specifications. The layout service 205 can map the one or more user interface specifications and resources into APIs (e.g., scripts, images, video, text, user interface elements, styles sheets, web pages, or any other elements which may be a part of a micro-frontend) which are accessible via the micro-services layer 340. The layout service 205 can receive one or more requests from either the teams 335 or the customer 305 to onboard one or more micro-services to the micro-service layer 340, and in response, provide the functionalities described herein above with respect to FIG. 2 to onboard the micro-service. The layout service 205 can include any and all code (e.g., scripts, resources, etc.) to render one or more micro-services or micro-frontends, including any and all frameworks and common dependencies.

The teams 335 can be groups which develop one or more micro-services and one or more micro-services frontends for onboarding to the micro-service layer 340. The teams 335 can provide one or more resources (e.g., the first team 335A provides the resources 260A, and the second team 335B provides the resources 260B, etc.) to the layout service 205 or the micro-services layer 340 to onboard a micro-service. Each micro-service developed by the one or more teams 335 can include a framework, for example a scripting framework (e.g., React, ReactJS, VueJS, AngularJS, etc.). The one or more teams can also develop and provide one or more user interface specifications associated with a micro-service or a micro-frontend to the layout service 205 to onboard a micro-service to the micro-services layer 340. The teams 335 can provide scripts, style sheets, web pages, images, video, text assets, or any other resource 260, user interface specification, meta data, or any other information to onboard a micro-service to the micro-services layer 340. In some implementations, the teams 335 can be the same as, or include, the customer 305. The teams 335 can create one or more micro-services using different versions of a framework, or using different frameworks. For example, the first team 335A can create a micro-service and micro-frontend using a first version of ReactJS, and the second team 335B can create micro-service and micro-frontend using a second version of ReactJS. In another example, the first team 335A can create a micro-service and a micro-frontend using a first version of ReactJS, and the second team 335B can create a micro-service.

The micro-services layer 340 can include one or more APIs, user interface specifications, or resources 260 to provide the one or more micro-frontends of one or more micro-services to at least one customer 305 or at least one team 335. The micro-services layer can include, or be a part of, the content delivery network 215 described herein above in conjunction with FIG. 2. The micro-services layer can provide one or more micro-services to the layout service, including one or more resources, scripts, APIs, user interface specifications, web pages, or other information to provide one or more micro-frontends to the customer 305. The micro-services layer 340 can execute any and all code associated with the micro-services provided by the micro-services layer 340, for example server-side code, cloud computing, or any other kind of computing operations required by the micro-services provided by the micro-services layer 340. The micro-services layer 340 can receive one or more request for functionality via one or more API calls 330. The API calls 330 can include requests for updated information, or may include one or more data packets for processing by the micro-services of the micro-services layer 340. For example, the micro-services layer 340 may receive a periodic query to provide updated information about a particular service executed by the micro-services layer 340 via an API call 330 from a customer 305. The micro-services layer 340 can provide the requested information (e.g., update information, processing information, micro-services layer status information, or any other requested information, etc.) to the customer 305 in response to the request via the API call 330.

Figure 4:
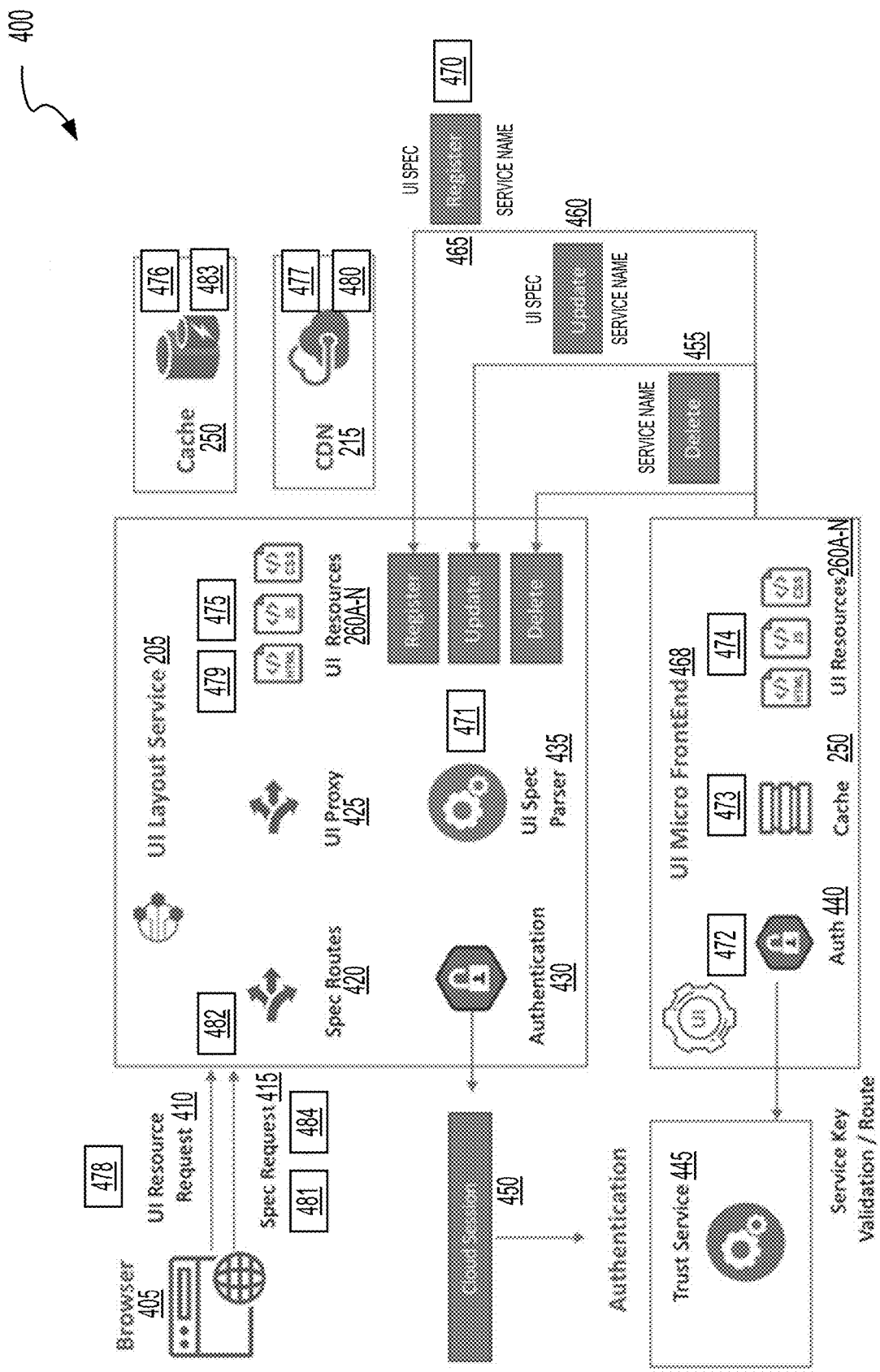
FIG. 4 depicts a block diagram of an example system flow of onboarding, updating, and requesting specifications and resources for one or more micro-frontends.

Referring now to FIG. 4, depicted is a system flow diagram 400 for onboarding a micro-service (e.g., a micro-service 265) using the layout service 205, for requesting a micro-service using the layout service 205, or for requesting a user interface specification using the layout service 205. The system flow diagram 400 can include at least one browser 405, at least one layout service 205. In the system flow diagram 400, the layout service can include at least one spec (e.g., user interface specification) router 420, at least one user interface (UI) proxy 425, at least one resource 260A-N, at least one authentication module 430, and at least one UI spec parser 435. The system flow diagram can include at least one cloud session 450, at least one trust service 445, at least one UI micro-frontend 468, and at least one UI spec action including delete 455, update 460, and register 465. The system flow diagram 400 can include at least one cache 250, and at least one content delivery network 215. The UI micro-frontend 468 can include at least one authorization certificate 440, at least one cache 250, and at least one UI resource 260.

The system flow diagram 400 can include one or more of registering or updating micro-service micro-frontends, requesting user interface specifications for micro-service micro-frontends, and UI resource routing for rendering micro-service micro-frontends. Registering or updating micro-service micro-frontends can include ACTS 470-477. Requesting user interface specifications can include ACTS 481-484. UI resource routing for rendering micro-service micro-frontends can include ACTS 478-480. Each of these ACTS can be performed by any of the modules, components or actors depicted in FIG. 1A, 1B, 2, 3 or 4, including, for example, the layout service 205 or the browser 405.

The browser 405 can be executed, for example, by a client device (e.g., the client device 220 described herein in conjunction with FIG. 2) to provide a web application composed of one or more micro-frontends for one or more micro-services (e.g., the micro-services 265). The browser 405 can make one or more requests to the layout service 205, or the modules included in the layout service 205. The browser 405 may interact with the layout service 205 to request one or more micro-frontends (e.g., the UI micro-frontend 468) for display in a web application in the browser 405. The browser 405 can request to perform one or more of the actions depicted as a part of the system flow diagram 400, for example a request to delete a micro-frontend 455, a request to update a micro-frontend 460, or a request to register a micro-frontend 465.

The layout service 205 can perform any of the operations or functions described herein above in conjunction with FIGS. 2 and 3, and can perform any or all of the operations, functions, or method steps included in the system flow diagram 400. The layout service 205 can include at least one specification router 420. The specification router 420 (e.g., the specification retriever 230) can respond to a user interface specification request from the browser 405. The specification router 420 can be a part of, and perform any of the functionality of, the specification retriever 230. The layout service can include a UI proxy 425, which can determine one or more locations in the content delivery network 215 for the one or more resources 260. The UI proxy 425 can be a part of, and perform any of the functionality of, the tag injector 240 or the data object loader 245. The layout service 205 can include at least one UI specification parser 435, which can parse user interface specifications to identify one or more resources 260 associated with the corresponding micro-frontend. The UI specification parser 435 can be a part of, and perform any of the functionality of, the resource identifier 235. Accordingly, the layout service 205 can perform any and all of the functionalities described herein with respect to the system flow diagram 400, and may include any or all modules or subcomponents described herein.

The layout service 205 can onboard, register, or update a micro-frontend 468. The layout service 205 can register the micro-frontend (ACT 470). The layout service 205 can parse a UI specification (ACT 471). The layout service 205 connect to an authentication service (ACT 472), for example the trust service 445. The layout service 205 can authenticate the cache updates for a UI micro-frontend (ACT 473). The layout service 205 can authenticate one or more resources 260A-N for a UI micro-frontend (ACT 474). The layout service 205 can upload the authenticated resources 260 to the content delivery network 215 (ACT 475). The layout service 205 can store one or more UI specifications in the cache 250 (ACT 476). The layout service 205 can store additional data in the content delivery network 215 (ACT 477).

The layout service 205 can register or update a micro-frontend (ACT 470). For example, the browser 405 may send a request to update the micro micro-frontend using update command 460, or a request to register the micro-frontend using the register command 465. In response to the commands, the layout service 205 can receive one or more user interface specifications provided by the browser 405, or another computing via a network (e.g., the network 210). The request to update 460 or register 465 can include at least one UI resource 260.

In response to the request, the layout service 205 can use the UI specification to download all the micro-service resources (ACT 471). The layout service 205 can use the UI specification parser 435 to parse the user interface specification to identify a list of resources 260 to download from one or more computing devices, for example the computing device executing the browser 405 or the content delivery network 215. In some implementations, the UI specification parser can determine that the one or more resources 260 have already been downloaded, and access the already downloaded resources stored in the memory of the layout service 205 instead of downloading the resources 260 from another computing device. Downloading the one or more resources 260 can include storing the resources 260 in one or more data structures in the memory of the layout service 205. In some implementations, before downloading the one or more resources 260 for the micro-frontend 468, the layout service 205 may authenticate the browser 405 or the micro-frontend 468.

Before registering (e.g., onboarding) or updating the micro-frontend 468 in response to the request, the layout service can request an authentication script certificate 440 to authenticate the micro-frontend (ACT 472). For example, the layout service 205 can use the authentication module 430 to access a trust service 445. The trust service 445 can verify the request to onboard a micro-frontend, for example, by verifying the authenticity of the request received by the browser 405. If the trust service 445 verifies the authenticity of the browser 405, the trust service can issue an authentication certificate 440 for the micro-frontend 468, verifying its authenticity. If the trust service cannot verify the authenticity of the browser 405, the trust service may not issue an authentication certificate 440 for the micro-frontend 468, and the layout service 205 can stop registering or updating the micro-frontend 468. Authentication may improve the security of micro-frontend 468 registering process, particularly on public networks.

After receiving the authentication certificate(s) from the trust service 445, the layout service can download the one or more UI resources 260 from the computing device providing the micro-service (e.g., the computing device providing the request to register/update the micro-frontend 468, etc.). Downloading the one or more resources can include downloading one or more user specifications, scripts, or web pages to store in the cache 250 (ACT 473), or downloading one or more of the UI resources to store in the content delivery network 215 (ACT 274). The layout service 205 can store any and all information downloaded as a part of (ACT 273) or (ACT 274) in one or more data structures in the memory of the layout service 205. In some implementations, storing the downloaded information is performed using a temporary storage, for example a data buffer.

Once the one or more resources 260 and the user interface specifications have been downloaded, along with any other information required to register or update the micro-frontend 468, the layout service can upload each of the downloaded items to a respective location (ACT 475). The layout service 205 can upload the one or more UI specifications, along with any other meta data, to the cache 250 (ACT 476). Uploading the UI specifications and meta data can include allocating one or more data structures in the cache 250, and storing the UI specifications and meta data in the one or more data structures. The layout service 205 can store the one or more resources 260 in the content delivery network 215 (ACT 477). Storing the one or more resources 260 can include allocating one or more data structures in the memory of the content delivery network 215, and uploading the one or more resources 260 for storage in the data structures of the content delivery network 215.

Once a micro-frontend 468 has been registered by the layout service 205, it may be provided to one or more requesting computing devices (e.g., the computing device executing the browser 405). The layout service can receive a request for a UI specification (e.g., specification request 415) from the browser 405 (ACT 481). The request for a UI specification can be received by the layout service 405, for example, by one or more scripts executing in a web application in the browser 405. The request for a UI specification can include one or more identifiers of a micro-frontend 468 which corresponds to the UI specification, for example an index value, the name of the UI frontend 468, or another type of identifier of the requested UI frontend 468. In some implementations, the request for a UI specification can include an invocation by the browser 405 of a layout API to get any and all micro-frontend 468 UI specifications to render a web application composed of one or more micro-frontends 468.

In response to the request for a UI specification, the layout service 205 determine a location of the UI specification using, for example, the specification router 420 (ACT 482). The specification router 420 can parse the request received from the browser to retrieve one or more identifiers of the requested micro-frontend 268. Based on the identifier of the micro-frontend 468, the specification router 420 can determine a location in the cache 250 of the UI specification. For example, the specification router 420 can use a lookup table including the one or more identifiers of the UI specification and one or more locations in the cache 250 of the UI specifications. The lookup table can map an identifier of a UI specification to a location of that UI specification in the cache 250. Based on the contents of the lookup table, the specification router can determine the location in the cache 250 of the UI specification corresponding to the requested micro-frontend 468. If the user specification corresponding to the requested micro-frontend is not in the cache 250 or not in the lookup table used by the specification router 420, the specification router 420 can return an error message to the browser 405, for example an error message including an indication that the requested micro-frontend cannot be loaded.

Once the location of the corresponding UI specification has been determined by the specification router 420, the layout service 205 can access the cache 250 to retrieve the UI specification (ACT 483). In some implementations, the cache 250 can be a part of the layout service 205, and the specification router 420 can access the cache as a part of the layout service 205 to retrieve the one or more UI specifications corresponding to the request, and store them in a region of working memory in the layout service 205. In some implementations, the cache 250 is external to the layout service 205, and the specification router 420 can access the cache via a network (e.g., the network 210), download the one or more UI specifications corresponding to the request, and store the requested UI specifications in a region of working memory in the layout service 205.

In response to retrieving the UI specifications corresponding to the one or more micro-frontends, the UI specifications can be transmitted via a network (e.g., the network 210) to the browser 405 (ACT 484). In some implementations, the UI specifications are not transmitted to the browser 405, and instead the layout service 205 can forward the retrieved UI specifications to the UI specification parser 435. The browser 405 can determine, based on the UI specification, which of the UI resources 260 need to be downloaded to render the one or more micro-frontends 468. The one or more UI resources 260 may be determined, for example, based on the contents of the one or more UI specifications, or the web application executing in the browser 405.

The layout service 205 can perform UI resource routing to provide the browser 405 with the one or more UI resources 260, which can be used to render the one or more requested micro-frontends 468 in the web application executing in the browser 405. The layout service 205 can parse the UI specifications to get a list of resources 260 which can be loaded to render the micro-frontend 468 in the browser 405 (ACT 478). For example, the UI specification parser 435 can scan through each of the one or more UI specifications, and determine which UI resources 260 can be downloaded to render the one or more micro-frontends 468. The layout service 205 can receive a UI resource request 410 from the browser 405 to determine which UI resources 260 can be downloaded to render the one or more micro-frontends 468. In some implementations, the UI specification parser 435 can resolve any conflicts between two or more of the resources 260, and de-duplicate any requests for resources 260 between two or more micro-frontends 468. For example, if two micro-frontends 468 require a common resource, the UI specification parser 435 can determine that the common resource need only be requested from the content delivery network 215 one time. This is a significant improvement over other implementations, because the UI specification parser 435 can dynamically determine which resources are requested more than once, and automatically de-duplicate the requests, thereby reducing the overall number of network requests, resulting in increased network performance. This is a significant improvement over other implementations which may not use de-duplication of resource 260 requests. Parsing the UI specifications can also be performed by the browser 405. Parsing the UI specifications for the list of resources 260 can include returning a location in the content delivery network 215 for each network resource 260.

The layout service 205 can dynamically add script and style tags based on the list of UI resources 260 parsed from the one or more UI specifications (ACT 479). For example, the UI specification can include an indication to display a certain UI resource on the web-page rendered by the browser. By parsing the UI specification, the layout service 205 can determine a tag, and corresponding tag metadata, to add to the web-page to be displayed by the browser 405 to render the UI resource 260 identified in the UI specification. The tag metadata can include the location of the corresponding UI resource in the content delivery network 215. The layout service 205 can insert the tags, style sheets, or scripts specified by the one or more UI specifications into the web-page to be rendered by the browser 405. In some implementations, the layout service 205 can dynamically add the tags, scripts, or style sheets to the web-page to be rendered by the browser 405.

Once the tags, scripts, or style sheets have been inserted or dynamically added to the web page to be rendered by the browser 405, the layout service 205 can retrieve each of the resources 260 identified by the tags in the web-page from the content delivery network 215 (ACT 480). For example, each tag may represent an indication for the browser 405 to render a particular resource. The layout service 205 can access the locations indicated by the tags in the web page to download the one or more resources 260 from the content delivery network 215. In some implementations, downloading the one or more resources from the content delivery network 215 can include creating a resource package. The resource package can include each of the resources required to render the one or more micro-frontends 468, and can be transmitted to the browser 405 by the layout service 205. In some implementations, the browser 405 can request and download each of the resources from the content delivery network 215.

Figure 5:
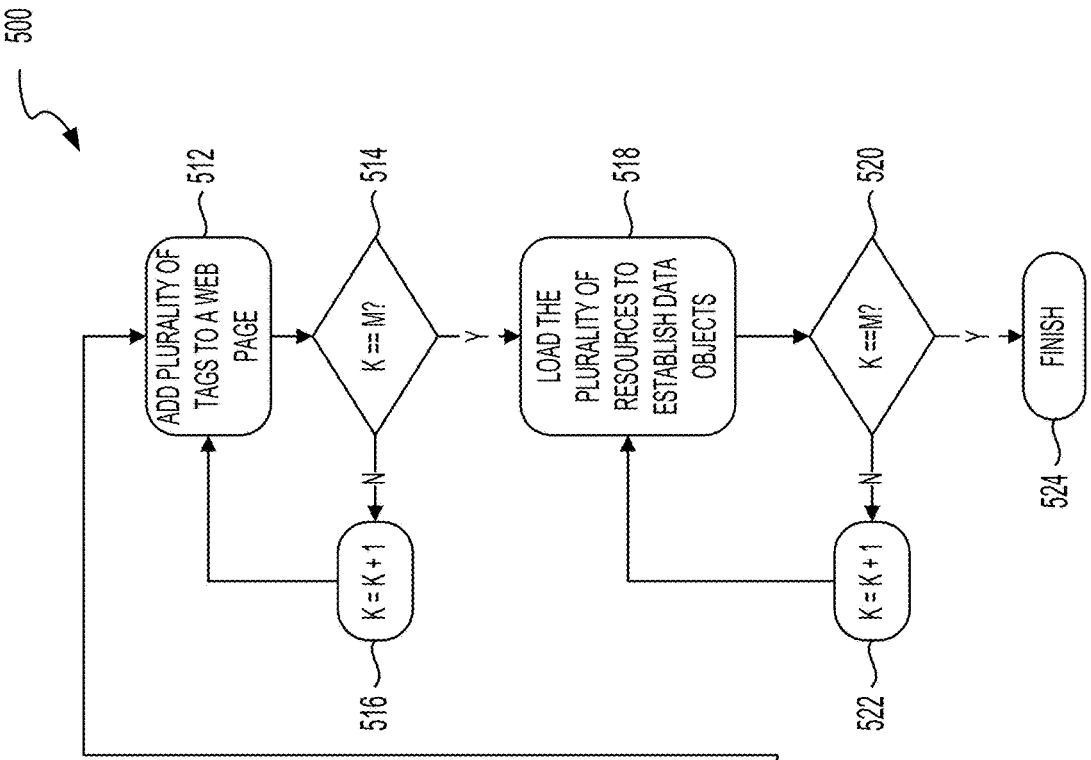
FIG. 5 depicts an example flow diagram of a method for providing a web application composed of micro-frontends.
Figure 5:
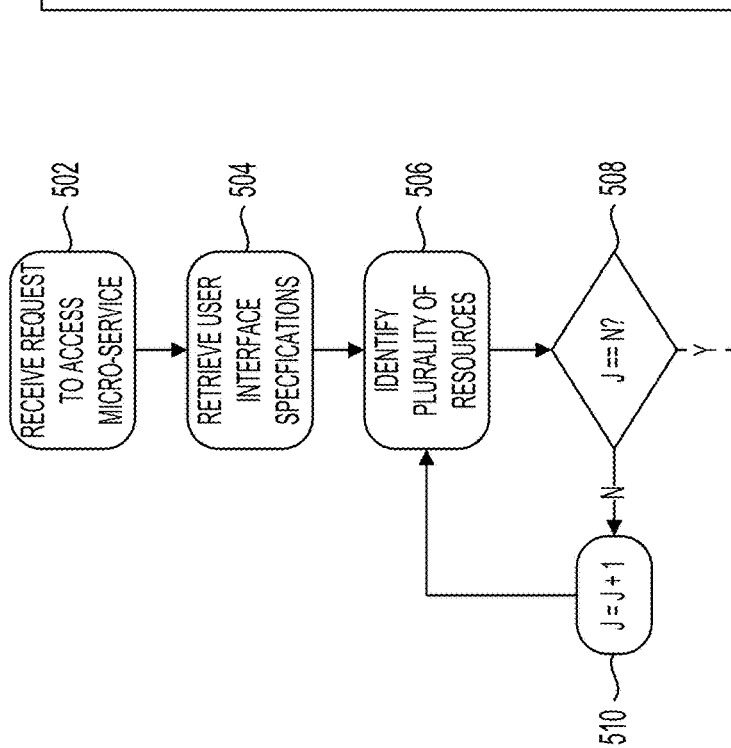

Referring now to FIG. 5, depicted is a method 500 for providing one or more micro-frontends corresponding to one or more micro-services for display in a web-application composed of the one or more micro-frontends. The method 500 can be performed by one or more system, component or element depicted in FIG. 1A, 1B, 2, 3 or 4, including, for example, the layout service 205, the client device 220, the content delivery network 215, or any other computing devices described herein. The layout service (e.g., the layout service 205 described herein above in conjunction with FIGS. 2-4) can receive a request to access a micro-frontend micro-service of a plurality of micro-services (ACT 502). The layout service can retrieve one or more user interface specifications corresponding to a micro-service of the plurality of micro-services (ACT 504). The layout service can identify a plurality of resources used by the micro-service of the plurality of micro-services corresponding to the one or more user interface specifications (ACT 506). The layout service can determine whether the counter register j is equal to the number of user interface specifications n (DECISION 508). The layout service can increment the counter register j (ACT 510). The layout service can add a plurality of tags to the web page based on the plurality of identified resources (ACT 512). The layout service can determine whether the counter register k is equal to the number of resources m (DECISION 514). The layout service can increment the counter register k (ACT 516). The layout service can load the plurality of resources to establish data objects for rendering on the web page (ACT 518). The layout service can determine whether the counter register k is equal to the number of resources m (DECISION 520). The layout service can increment the counter register k (ACT 522). The layout service can finish performing the method 500 (ACT 524).

The layout service (e.g., the layout service 205 described herein above in conjunction with FIGS. 2-4) can receive a request to access a micro-frontend micro-service of a plurality of micro-services (ACT 502). The request can be received from an application executing on a client device. The request can be a request to access a micro-frontend of a user interface for a web application composed of a plurality of micro-frontends provided via a plurality of heterogeneous micro-services. The micro-frontends can be, for example, one or more portions of a user interface for display. The micro-frontends provided by the layout service can include one or more user interface data objects, and may include one or more APIs to access the functionality of the corresponding micro-service of the plurality of heterogeneous micro-services. In some implementations, the request can include the web-page of a web application to render the micro-frontend. In some implementations, the request can include a request for more than one micro-frontend, where each micro-frontend corresponds to at least one micro-service of the plurality of micro-services.

The layout service can retrieve one or more user interface specifications, each of the user interface specifications corresponding to a micro-service of the plurality of micro-services (ACT 504). Each micro-frontend identified by the request from the client application can include an indication of one or more user interface specifications. The user interface specifications can include one or more resources which can be used to render the corresponding micro-frontend. Each user interface specification can correspond to at least one micro-service of the plurality of heterogeneous micro-services that provides the micro-frontend for display in the web application executing on the client device (e.g., the client device 220). In some implementations, the layout service can retrieve the one or more user interface specifications from one or more data structures in a cache of the layout service. For example, the request for one or more micro-frontends can cause the layout service to determine one or more locations in the cache (e.g., the cache 250) where the corresponding user interface specifications reside. The layout service can access the cache at each of the determined locations, and retrieve the one or more user interface specifications from the cache. The layout service can place the retrieved user interface specifications, for example, in a region of working memory in the layout service.

The layout service can identify a plurality of resources (e.g., the resources 260) used by the micro-service of the plurality of micro-services corresponding to the one or more user interface specifications (ACT 506). The plurality of resources can each be used by the micro-service of the plurality of heterogeneous micro-services corresponding to the one or more user interface specifications. For example, each user interface specification can include one or more lists of resources. The layout service can parse a selected user interface specification based on a counter register k. For example, each user interface specification, after retrieval, can be assigned an index value in the memory of the layout service (e.g., index 0, index 1, index 2, etc.). The layout service can parse each of the user interface specifications to populate a list of resources for the micro-service requested by the client application executing on the client device. For example, the layout service can select the user interface specification with an index value which is equal to the counter register j. If it is the first iteration of this loop, the layout service can set the counter register j to an initialization value, for example zero. The layout service can parse the selected user interface specification to determine a list of one or more resources. If the list of resources already exists for the micro-service (e.g., has already been created by parsing another user interface specification), the layout service can add to the existing list of resources for that micro-service. Identifying the list of resources for the micro-service can include identifying a location of each resource in a content delivery network. In some implementations, the layout service can de-duplicate existing resources from the list of resources, thereby reducing the overall number of future network transactions to download each of the list of resources. The layout service can determine and resolve any conflicts between the one or more resources identified from the one or more user interface specifications.

The layout service can determine whether the counter register j is equal to the number of user interface specifications n (DECISION 508). To determine whether the layout service has identified resources from each user interface specification, the layout service can compare the counter register j used to select each user interface specification to the total number of user interface specifications n. If the counter register j is not equal to (e.g., less than) the total number of user interface specifications n, the layout service can execute (ACT 510). If the counter register j is equal to (e.g., equal to or greater than) the total number of user interface specifications n, the layout service can execute (ACT 512).

The layout service can increment the counter register j (ACT 510).). In some implementations, the layout service can add one to the counter register j to indicate the next unprocessed user interface specification in the memory of the layout service. In some implementations, the layout service can set the counter register j to a memory address value (e.g., location in computer memory) of the next unprocessed user interface specification. In some implementations, the memory address value of the next unprocessed user interface specification can be included in the data structure at the location of the current (e.g., selected) user interface specification. After incrementing the value of the counter register j, the layout service can execute (ACT 506) of the method 500.

The layout service can add a plurality of tags to the web page based on the plurality of identified resources (ACT 512). The layout service can receive the web page from the application executing on the client device, or in some implementations, the layout service can generate the web page. The web page can be used to render the one or more micro-frontends corresponding to the micro-services of the plurality of heterogeneous micro-services. The layout service can select one of the resources in the list of resources identified from the one or more user interface specifications at (ACT 506). Each resource in the list of resources can be indexed by an index value (e.g., index 0, index 1, etc.). The layout service can select, for example, the resource in the list of resources with an index value that is equal to the counter register k. If it is the first iteration of this loop, the layout service can set the counter register k to an initialization value, for example zero. Each resource in the list of the plurality of resources can include a location of the corresponding resource in the content delivery network (e.g., the content delivery network 215). Based on the selected resource, the layout service can add one or more tags to the web-page to display the selected resource. In some implementations, if the selected resource is a script or a style sheet, the layout service can insert the script or style sheet into the web page. The tags inserted into the web page can include an identifier of the location of the resource in the content delivery network, and any metadata associated with the resource. In some implementations, the layout service can insert tags in the web page based on the contents of the user interface specification as well as the one or more resources in the list of identified resources.

The layout service can determine whether the counter register k is equal to the number of resources m (DECISION 514). To determine whether the layout service has added tags for each of the identified resources, the layout service can compare the counter register k used to select each of the identified resources to the total number of identified resources m. If the counter register k is not equal to (e.g., less than) the total number of identified resources m, the layout service can execute (ACT 516). If the counter register k is equal to (e.g., equal to or greater than) the total number of identified resources m, the layout service can execute (ACT 518).

The layout service can increment the counter register k (ACT 516). In some implementations, the layout service can add one to the counter register k to indicate the next unprocessed resource in the list of identified resources in the memory of the layout service. In some implementations, the layout service can set the counter register k to a memory address value (e.g., location in computer memory) of the next unprocessed resource in the list of identified resources. In some implementations, the memory address value of the next unprocessed resource in the list of identified resources can be included in the data structure at the location of the current (e.g., selected) resource in the list of identified resources. After incrementing the value of the counter register k, the layout service can execute (ACT 512) of the method 500.

The layout service can load the plurality of resources to establish data objects for rendering on the web page (ACT 518). The data objects can be established for the micro-service of the plurality of heterogeneous micro-services in a script environment, for example a JavaScript. The JavaScript can be established by one or more frameworks, for example a scripting framework (e.g., VueJS, ReactJS, AngularJS, etc.). Using the data objects, the layout service can construct a document object model for rendering in the client application executing on the client device. In some implementations, the client applicant can construct the document object model based on the data objects established by the layout service. Each of the resources in the list of resource identified by the user interface specifications can be accessed to create one or more script objects based on at least one framework. Each resource in the list of resources can be indexed by an index value (e.g., index 0, index 1, etc.). The layout service can select, for example, the resource in the list of resources with an index value that is equal to the counter register k. If it is the first iteration of this loop, the layout service can set the counter register k to an initialization value, for example zero. Based on the selected resource, the layout service can download and establish a data object for a particular framework which can be used in a document object model. In some implementations, the framework is determined based on the one or more user interface specifications retrieved in (ACT 504). In some implementations, establishing the data objects can include providing each data object in a script scope, rather than a global scope, to enhance the security of the system.

The layout service can determine whether the counter register k is equal to the number of resources m (DECISION 520). To determine whether the layout service has loaded each resource to establish a data object, the layout service can compare the counter register k used to select each of the identified resources to the total number of identified resources m. If the counter register k is not equal to (e.g., less than) the total number of identified resources m, the layout service can execute (ACT 522). If the counter register k is equal to (e.g., equal to or greater than) the total number of identified resources m, the layout service can finish executing method 500 (ACT 524).

The layout service can increment the counter register k (ACT 522). In some implementations, the layout service can add one to the counter register k to indicate the next unprocessed resource in the list of identified resources in the memory of the layout service. In some implementations, the layout service can set the counter register k to a memory address value (e.g., location in computer memory) of the next unprocessed resource in the list of identified resources. In some implementations, the memory address value of the next unprocessed resource in the list of identified resources can be included in the data structure at the location of the current (e.g., selected) resource in the list of identified resources. After incrementing the value of the counter register k, the layout service can execute (ACT 512) of the method 500.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It will be further understood that various changes in the details, materials, and arrangements of the parts that have been described and illustrated herein may be made by those skilled in the art without departing from the scope of the following claims.

We claim:

1. A method of providing a web application composed of micro-frontends, comprising:
   receiving, by a layout service executing on one or more processors from a client application executing on a client device, a request to access a micro-frontend of a user interface for a web application composed of a plurality of micro-frontends provided via a plurality of heterogeneous micro-services;
   retrieving, by the layout service responsive to the request, one or more user interface specifications corresponding to a micro-service of the plurality of heterogeneous micro-services that provides the micro-frontend;
   identifying, by the one or more processors, a plurality of resources used by the micro-service of the plurality of heterogeneous micro-services corresponding to the one or more user interface specifications;
   adding, by the layout service, a plurality of tags to a web page based on the plurality of resources identified for the micro-service of the plurality of heterogeneous micro-services; and
   loading, by the layout service responsive to the addition of the plurality of tags to the web page, the plurality of resources to establish data objects for the micro-service of the plurality of heterogeneous micro-services in a JavaScript used by a framework to construct a document object model for rendering, via the client application executing on the client device, the micro-frontend of the user interface of the web application composed of the plurality of micro-frontends established by the plurality of heterogeneous micro-services.

2. The method of claim 1, comprising onboarding, by the layout service using the one or more user interface specifications, the plurality of heterogeneous micro-services in a cache and a content delivery network that is accessible by the layout service during runtime.

3. The method of claim 1, comprising:
   storing, in cache accessible by the layout service, the one or more user interface specifications corresponding to the plurality of heterogeneous micro-services;
   parsing the one or more user interface specifications to identify the plurality of resources associated with the plurality of heterogeneous micro-services; and
   downloading, via a public network or using a default authentication policy, the plurality of resources for storage in a content delivery network by the layout service.

4. The method of claim 1, comprising:
   onboarding a first micro-service of the plurality of heterogeneous micro-services during a first release cycle; and
   onboarding a second micro-service of the plurality of heterogeneous micro-services during a second release cycle different from the first release cycle, wherein the first micro-service and the second micro-service are used to provide the plurality of micro-frontends that compose the user interface of the web application.

5. The method of claim 1, comprising:
   receiving an update to a subset of the plurality of heterogeneous micro-services; and
   onboarding the subset of the plurality of heterogeneous micro-services to provide the user interface of the web application composed of the plurality of micro-frontends established by the plurality of heterogeneous micro-services comprising the updated subset of the plurality of heterogeneous micro-services.

6. The method of claim 1, wherein the plurality of heterogeneous micro-services are constructed using a plurality of different frameworks comprising at least two of React, AngularJS, or VueJS.

7. The method of claim 1, comprising loading a plurality of cascade style sheets corresponding to the plurality of micro-frontends established by the plurality of heterogeneous micro-services to compose the user interface of the web application.

8. The method of claim 1, comprising:
   resolving conflicts between the plurality of heterogeneous micro-services; and
   de-duplicating, during loading, the data objects used by the plurality of micro-frontends.

9. The method of claim 1, comprising:
   rendering at least two of the plurality of micro-frontends; and
   communicating information between the rendered at least two of the plurality of micro-frontends using a JavaScript properties variable or a JavaScript context variables.

10. The method of claim 1, wherein the user interface of the web application composed of the plurality of micro-frontends is rendered without an inline frame.

11. A system to provide a web application composed of micro-frontends, comprising:
    one or more hardware processors executing a layout service configured to:
       receive, from a client application executed on a client device, a request to access a micro-frontend of a user interface for a web application composed of a plurality of micro-frontends provided via a plurality of heterogeneous micro-services;
       retrieve, responsive to the request, one or more user interface specifications corresponding to a micro-service of the plurality of heterogeneous micro-services that provides the micro-frontend;
       identify a plurality of resources used by the micro-service of the plurality of heterogeneous micro-services corresponding to the one or more user interface specifications;
       add a plurality of tags to a web page based on the plurality of resources identified for the micro-service of the plurality of heterogeneous micro-services; and load, responsive to the addition of the plurality of tags to the web page, the plurality of resources to establish data objects for the micro-service of the plurality of heterogeneous micro-services in a JavaScript used by a framework to construct a document object model rendered, via the client application executing on the client device, the micro-frontend of the user interface of the web application composed of the plurality of micro-frontends established by the plurality of heterogeneous micro-services.

12. The system of claim 11, wherein the layout service is further configured to onboard, using the one or more user interface specifications, the plurality of heterogeneous micro-services in a cache and a content delivery network that is accessible by the layout service during runtime.

13. The system of claim 11, wherein the layout service is further configured to:
store, in cache accessible by the layout service, the one or more user interface specifications corresponding to the plurality of heterogeneous micro-services;
parse the one or more user interface specifications to identify the plurality of resources associated with the plurality of heterogeneous micro-services; and
download, via a public network or using a default authentication policy, the plurality of resources for storage in a content delivery network by the layout service.

14. The system of claim 11, wherein the layout service is further configured to:
onboard a first micro-service of the plurality of heterogeneous micro-services during a first release cycle; and
onboard a second micro-service of the plurality of heterogeneous micro-services during a second release cycle different from the first release cycle, wherein the first micro-service and the second micro-service are used to provide the plurality of micro-frontends that compose the user interface of the web application.

15. The system of claim 11, wherein the layout service is further configured to:
receive an update to a subset of the plurality of heterogeneous micro-services; and
onboard the subset of the plurality of heterogeneous micro-services to provide the user interface of the web application composed of the plurality of micro-frontends established by the plurality of heterogeneous micro-services comprising the updated subset of the plurality of heterogeneous micro-services.

16. The system of claim 11, wherein the plurality of heterogeneous micro-services are constructed using a plurality of different frameworks comprising at least two of React, AngularJS, or VueJS.

17. The system of claim 11, wherein the layout service is further configured to load a plurality of cascade style sheets corresponding to the plurality of micro-frontends established by the plurality of heterogeneous micro-services to compose the user interface of the web application.

18. The system of claim 11, wherein the layout service is further configured to:
resolve conflicts between the plurality of heterogeneous micro-services; and
de-duplicate the data objects used by the plurality of micro-frontends to load the plurality of resources.

19. A non-transitory computer readable medium storing program instructions for causing one or more processors to:
receive, from a client application executed on a client device, a request to access a micro-frontend of a user interface for a web application composed of a plurality of micro-frontends provided via a plurality of heterogeneous micro-services;
retrieve, responsive to the request, one or more user interface specifications corresponding to a micro-service of the plurality of heterogeneous micro-services that provides the micro-frontend;
identify a plurality of resources used by the micro-service of the plurality of heterogeneous micro-services corresponding to the one or more user interface specifications;
add a plurality of tags to a web page based on the plurality of resources identified for the micro-service of the plurality of heterogeneous micro-services; and
load, responsive to the addition of the plurality of tags to the web page, the plurality of resources to establish data objects for the micro-service of the plurality of heterogeneous micro-services in a JavaScript used by a framework to construct a document object model rendered, via the client application executing on the client device, the micro-frontend of the user interface of the web application composed of the plurality of micro-frontends established by the plurality of heterogeneous micro-services.

20. The non-transitory computer readable medium of claim 19, wherein the program instructions further cause the one or more processors to onboard, using the one or more user interface specifications, the plurality of heterogeneous micro-services in a cache and a content delivery network that is accessible by the one or more processors during runtime.

* * * * *